Figure 1:
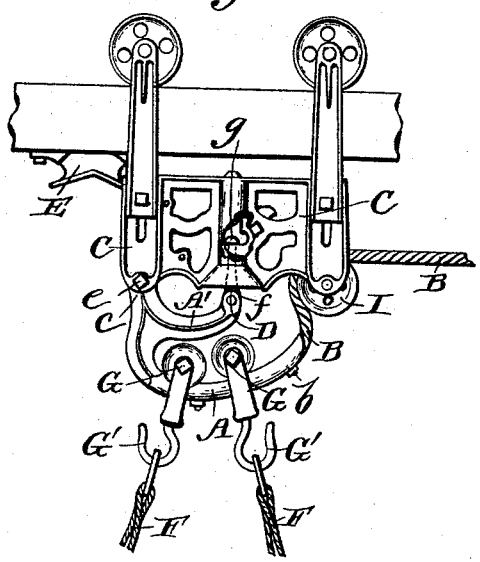

(No Model.) 2 Sheets—Sheet 1.
J. E. PORTER.
HAY ELEVATOR AND CARRIER.

No. 497,207. Patented May 9, 1893.

Witnesses
Geverance
C. C. Hills

Inventor
Joseph E. Porter
by Mason Fenwick Lawrence
his Attorneys (No Model.)

2 Sheets—Sheet 2.

J. E. PORTER.
HAY ELEVATOR AND CARRIER.

No. 497,207.

Patented May 9, 1893.

WITNESSES

INVENTOR
Joseph E. Porter
by his attorneys
Mason, Fenwick & Lawrence

UNITED STATES PATENT OFFICE.

JOSEPH E. PORTER, OF OTTAWA, ILLINOIS.

HAY ELEVATOR AND CARRIER.

SPECIFICATION forming part of Letters Patent No. 497,207, dated May 9, 1893.

Application filed February 23, 1893. Serial No. 463,372. (No model.)

*To all whom it may concern:*

Be it known that I, JOSEPH E. PORTER, a citizen of the United States, residing at Ottawa, in the county of La Salle and State of Illinois, have invented certain new and useful Improvements in Hay Elevators and Carriers; and I do hereby declare the following to be a full, clear, and exact description of the invention, such as will enable others skilled in the art to which it appertains to make and use the same.

My invention relates to a hay elevator and carrier which travels on an elevated or suspended rail-track, provided, preferably, with a sectional or two-part sling for receiving and holding the load of hay while it is being lifted to the requisite height for effecting the locking, by the locking bolt, of the draft rope and connecting arm to the carrier, and, while thus locked, holding the load of hay under compression in the sling, in which condition it is carried on the rail-track from the elevating point to the place of deposit, whereupon the locking device at the bottom of the sling may be separated by a trip provided for the purpose, and the load discharged.

One of the objects of my improvement is to have a connecting arm of such length that when the trolleys or pulleys travel and pass onto this arm, and the arm is locked at about the center of the frame of the carrier, they cannot pass off of the arm onto the draft rope until the carrier is unlocked, but when the arm is freed, the trolleys or pulleys shall be at liberty to follow along the draft rope to the load.

Another important object is to effect the compression of the load of hay and the locking of the connecting arm, by its locking bolt, at about the center of the carrier and thus render practicable the arrangement centrally of the carriage frame, of the devices which keep the locking bolt locked and the load firmly under compression in the sling until it is discharged; and another object is to provide in connection with a hay carrier and draft rope and sling or forks, connecting arm which by having one end bolted to a carrier frame or an attachment thereof, and the other to the draft rope, will support two separated trolleys or pulleys as they are drawn together by the draft rope, and at the proper time will lock into the carrier so as to retain the load compactly until discharged; also to retain the trolleys or pulleys off of the draft rope until the carrier is brought back and the locking bolt of the connecting arm released from the locking mechanism in the middle of the carrier, when the trolleys or pulleys will be free to follow the draft rope for reloading.

In all other devices where slings are used, the pulley or trolley is constructed to interlock when drawn up by the draft rope, a result which is very difficult to accomplish, inasmuch in order to interlock, the pulley or trolley must come up exactly even and this on account of some little irregularity in the load is prevented and thus the object sought is defeated and much trouble and waste of time experienced, whereas with my device the trolleys or pulleys necessarily run onto the connecting arm in the act of locking up the sling and they remain upon it after the locking is effected, and thus the compression of the load is retained, which is not the result in the other construction, for, if the trolleys are not locked, the compression of the load will force one or the other down or out and the desired object is not secured.

My invention consists in a draft rope and connecting arm adapted to be pivoted to the carriage frame of the hay carrier or to an attachment thereof, and provided with a shorter auxiliary arm carrying on its inner end a vibrating locking bolt, whereby, when the draft rope is drawn upon to such an extent as to raise a sling or fork and the load carried by the same to the determined altitude, the locking bolt is caused to enter a passage at or about the center of the carriage frame and is locked by the locking mechanism; this operation causing the free end of the connecting arm to about reach the draft rope guide sheave or pulley, and the trolleys of the sectional or two-part sling to lie on the connecting arm very close to each other, and the parts of the sling to very compactly compress the load of hay and hold it so, until the carriage arrives at the point where the hay is to be deposited.

My invention consists, secondly, in the combination with a draft rope and sling or fork or grapple connecting arm provided with a shorter upper auxiliary arm, of a headed or shouldered locking bolt which is connected by a pivot to the shorter, upper, arm so as to be capable of vibrating, and thus assume a vertical position in entering a central opening leading to the locking mechanism arranged at or about the center of the frame of the carriage.

My invention consists, thirdly, in the hereinafter described connecting-arm provided with two or more passages for the bolt by which it is pivoted to the frame of the carriage or an attachment thereof, and with a vibrating headed or shouldered locking bolt, whereby the said arm with the locking bolt attached is adapted to be set higher or lower on the carriage frame or an attachment thereof.

My invention consists, fourthly, in the combination with a hay carrier provided with a draft rope guide sheave, attached to it, or an attachment thereof, of the sectional or two-part sling having a trolley at each of the upper ends of its parts or sections, a connecting-arm provided with a pivoted headed or shouldered locking bolt, and pivoted by one end to the carriage, or an attachment thereof, and a draft rope attached to the free portion of the connecting-arm and passed over the said guide pulley.

Figure 2:
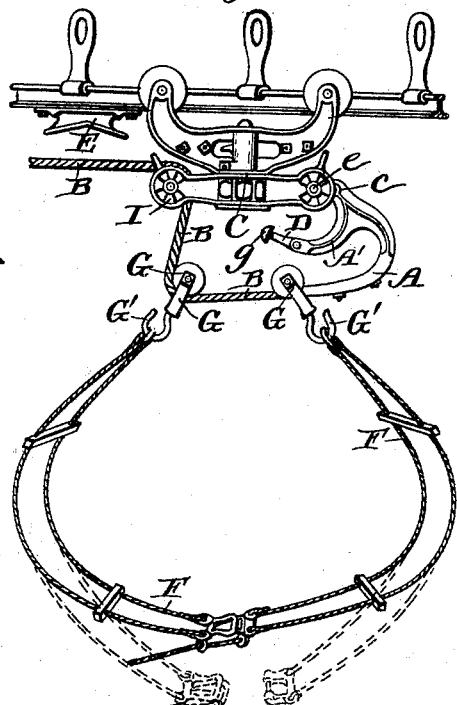
Figure 3:
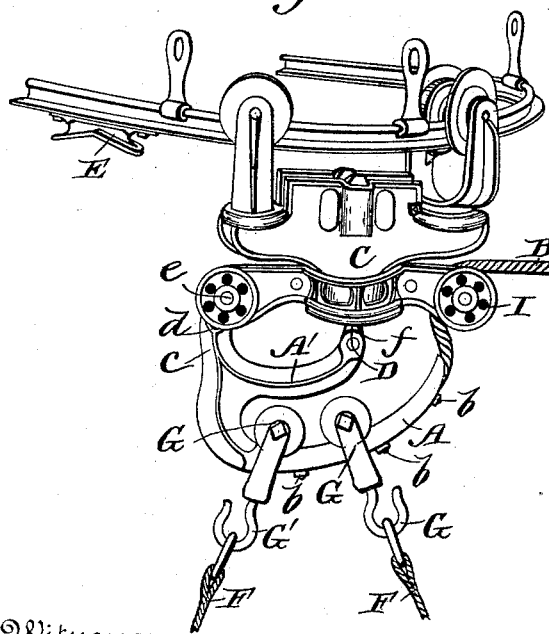
Figure 4:
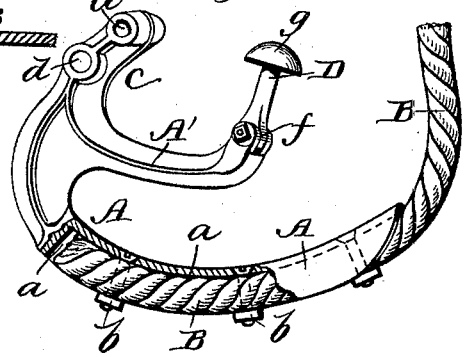
Figure 5:
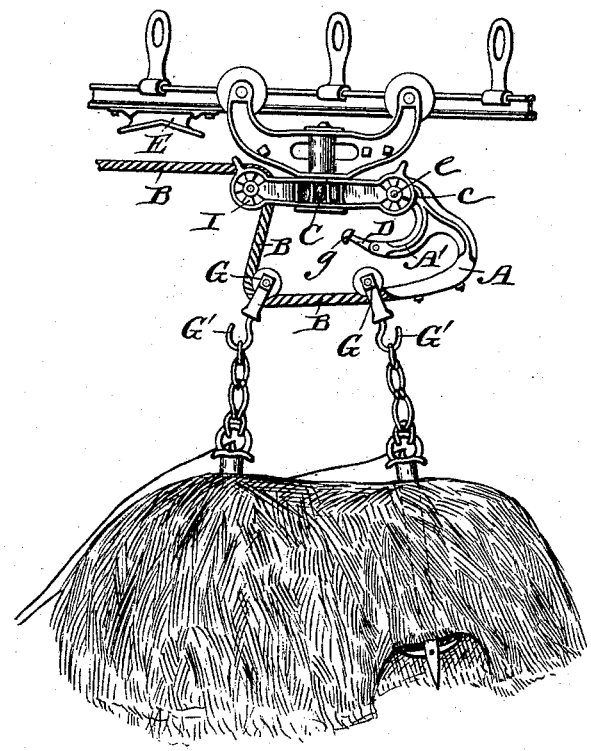

In the accompanying drawings, Figure 1 is a side elevation of one style of hay elevator and carriage track, and carriage with my invention. Fig. 2 is a side elevation of another style of hay elevator and carriage track and carriage with my invention; in this illustration the draft rope guide pulley, and my invention are connected to a swiveling attachment of the carriage. Fig. 3 is a view partly in perspective, illustrating my invention connected to a swiveling attachment of the carriage; also showing the wheels of the carriage attached to swiveling bearings, and the track with a curve in it, instead of straight. Fig. 4 is a broken perspective view of the improved connecting arm, locking bolt, and a portion of the draft rope, the parts of the connecting-arm broken away being sectioned. Fig. 5 is an illustration of my invention as used with forks instead of slings.

As my invention is intended for use with a carriage provided with well known locking and unlocking mechanism, and the carriage may be of any suitable construction, the description will be confined to my invention which is specially represented in detail in Fig. 4 and only enlarged, as necessary, to make plain its mode of application to different styles of hay elevators and carriers, as illustrated in the other figures of the drawings.

A represents the draft rope and connecting-arm. This arm is curved substantially as shown, and hollowed along a great part of its length on its under side, as indicated at $a$, and in its hollowed part the draft rope B is placed and fastened securely by bolts and nuts, as indicated at $b$. Beyond the hollowed portion, it is made solid and extended upward, forming a pivoting end $c$. In this end one, two or more pivot bolt passages or eyes as $d$ $d'$ are formed, and, by means of a pivot bolt $e$, the connecting-arm is pivoted to the carriage frame C, or to a swiveling portion thereof. Inwardly from the solid portion a shorter curved arm $A'$ is constructed, and the terminus of this arm is bifurcated, and the flattened end $f$ of the locking bolt D is fitted in this bifurcated portion so as to be capable of vibrating backward and forward. To enable the bolt D to thus vibrate, its lower end is made parallel with the bottom of the bifurcated portion, and is set a slight distance above the said bottom, and thus the bolt, while allowed to vibrate to the necessary extent is limited in its vibratory movement by the front and rear bottom corners of the lower end of the bolt striking against the bottom of the bifurcated portion. By thus constructing, arranging and pivoting the bolt, it is adapted for entering the usual vertical opening at the center of the carriage frame C, leading to ordinary locking mechanism; and it is also enabled to assume a vertical position during its movement from the position shown in Fig. 2 to the position shown in Figs. 1 and 3. The connecting arm A can also be pivoted to the carriage frame C by either its lower eye $d$ or higher eye $d'$, and thus it is adapted for different sizes and styles of carriage frames. The bolt D is provided with a head $g$ or is suitably shouldered at its upper end to receive beneath its head or shoulders ordinary locking devices applied centrally within the carriage frame C, which devices, as usual, are withdrawn to allow the bolt to drop from the position shown in Figs. 1 and 3 to the position shown in Fig. 2 when the usual knocker, as E, attached to the under side of the track, acts upon the said locking mechanism in the usual manner.

F is a sectional or two-part sling provided with means for holding its lower ends together while a load is on it, which means, when operated in the usual manner, allow the sections or parts of the sling to separate and the load of hay to discharge. To the upper end of each of the sections or parts of the sling, a trolley G with a hook G' is attached, and these trolleys run upon the upper side of the connecting-arm and the draft rope B, as illustrated. The draft rope, as usual, passes around a guide pulley I attached either to the frame of the carriage or to a swiveling portion thereof.

From the aforegoing description and accompanying drawings, it will be seen that the trolleys of the sling come very close together when the sling and its load are elevated as in Figs. 1 and 3; also that the trolleys cannot possibly pass off of the connecting arm when said arm is locked, as said arm inclines downward from the guide pulley and extends nearly to said pulley. It will also be seen that the bolt can assume with the connecting-arm and draft rope the position shown in Fig. 2, while the sling is unlocked and either rising or descending, and when the sling and load are raised to the locking position, the bolt can assume a vertical position and pass centrally up to the locking mechanism arranged centrally within the carriage frame, which position is the proper one for such mechanism.

My invention possesses many advantages, and is simple, safe and effective in operation.

As an equivalent of a sling such as described any suitable style of fork or grapple adapted for holding the load of hay to be elevated and carried and to be connected to the hook G' of separated pulleys or trolleys G running on an arm A A' provided with a locking bolt G, might be used without departing from the leading feature of my invention, which is a connecting arm so constructed and attached to the carrier and the draft rope, that when the two trolleys or pulleys are forced on the arm by pulling upon the draft rope, and the arm is locked at about the center of the carrier, the two trolleys or pulleys are held from getting off of said arm until the locking bolt of the arm is released from the locking mechanism of the carrier, which takes place at the period hereinbefore stated.

What I claim as my invention is—

1. In a hay elevator and carrier, a draft rope and connecting arm, adapted to be pivoted to the frame of the carrier, or to an attachment of said frame, and provided with an auxiliary shorter arm, and a locking bolt, attached to said shorter arm, substantially as described.

2. The combination, with a draft rope and connecting arm, provided with a shorter, upper, auxiliary arm, of a vibrating headed or shouldered locking bolt attached to the shorter arm, substantially as described.

3. The combination with the frame of the carrier, of the draft rope and connecting arm, provided with two or more eye passages for a pivot bolt, an auxiliary arm and a vibrating locking bolt, substantially as described.

4. The combination with a hay carrier carriage, or an attachment thereof, provided with a draft rope-guide pulley, and a draft rope, of the sectional or two-part sling having a trolley or pulley at each of the upper ends of its parts or sections, a connecting arm provided with a shorter, auxiliary arm and with a vibrating, headed or shouldered locking bolt, and pivoted by one of its ends to the carriage, or an attachment thereof, substantially as described.

5. The combination with a hay carrier, or an attachment thereof, provided with a draft rope, guide pulleys, of a sectional or two-part sling having a trolley or pulley attached to each part, a connecting arm having an upper auxiliary arm and a vibrating locking bolt, the said connecting arm being so shaped and of such length that when locked it extends near enough to the guide pulley to prevent the trolley from being forced out or off the arm, substantially as described.

In testimony whereof I have affixed my signature in presence of two witnesses.

JOSEPH E. PORTER.

Witnesses:
F. J. KEITH,
IRWIN I. HANNA.